(12) United States Patent
Watanabe (10) Patent No.: US 8,345,376 B2
(45) Date of Patent: Jan. 1, 2013

(54) MAGNETIC DISK DEVICE, MAGNETIC DISK, AND MAGNETIC DISK MANUFACTURING METHOD

(75) Inventor: Takeshi Watanabe, Penang (MY)

(73) Assignee: Fuji Electric Co., Ltd., Kawasaki-shi (JP)

( * ) Notice: Subject to any disclaimer, the term of this patent is extended or adjusted under 35 U.S.C. 154(b) by 0 days.

(21) Appl. No.: 13/348,213

(22) Filed: Jan. 11, 2012

(65) Prior Publication Data

US 2012/0243123 A1 Sep. 27, 2012

(30) Foreign Application Priority Data

Mar. 24, 2011 (JP) ................................. 2011-065186

(51) Int. Cl.
*G11B 17/34* (2006.01)
(52) U.S. Cl. ................................. 360/97.11
(58) Field of Classification Search ............... 360/97.11, 360/99.08, 92.1, 97.19, 98.01, 125.01, 234.3, 360/99.23
See application file for complete search history.

(56) References Cited

U.S. PATENT DOCUMENTS 5,541,789 A * 7/1996 Fukuoka et al. ........... 360/234.1
2006/0139789 A1 6/2006 Yang

FOREIGN PATENT DOCUMENTS

| JP | 2005-116112 A | 4/2005 |
| JP | 2006-190454 A | 7/2006 |
| WO | WO-2007/020723 A1 | 2/2007 |

OTHER PUBLICATIONS

Shinji Komatsu et al., "Effect of Interactions between Lubricant Functional End Groups and Magnetic Disk Surfaces on Patterning of Nanometer-Thick Liquid Lubricant Films", Nagoya University, pp. 415-416.
Yuki Shimizu et al., "Experimental and Numerical Simulation Study on Low-Surface Energy Slider With Thermal Flying-Height Control Function", IEEE Transactions on Magnetics, vol. 45, No. 10, Oct. 2009, pp. 3620-3623.

* cited by examiner

*Primary Examiner* — Allen Cao
(74) *Attorney, Agent, or Firm* — Rabin & Berdo, P.C.

(57) ABSTRACT

A magnetic disk is provided wherein a non-magnetic substrate, a magnetic layer, a protection layer, and a lubrication layer are sequentially stacked. The surface of the lubrication layer has irregular structure patterns along a circumferential direction of the magnetic disk that have circumferential lengths that each correspond to a central angle. The irregular structure patterns may be formed by an adsorption between the lubrication layer and the surface of the protection layer. When a natural frequency of a magnetic head slider used to record to the magnetic disk is f and the magnetic disk rotation speed is $R_0$, the central angle is set so as not to coincide with an angle $\theta_0$ expressed by $\theta_0 = 360 \times (R_0/60)/(f \times 1000)$.

15 Claims, 5 Drawing Sheets

MAGNETIC DISK DEVICE, MAGNETIC DISK, AND MAGNETIC DISK MANUFACTURING METHOD

This application is based on and claims the benefit of priority under 35 U.S.C. §119 from Japanese Patent Application No. 2011-065186, filed on Mar. 24, 2011, the contents of which are incorporated herein by reference.

BACKGROUND OF THE INVENTION

1. Technical Field

The present invention relates to a magnetic recording device, and in particular, relates to a magnetic recording device used as a computer external storage device, or the like.

2. Related Art

In a magnetic disk device such as a hard disk, a recording and reproduction of information is carried out in a data region on a magnetic disk in a condition in which a magnetic head flies above the magnetic disk. In recent years, in order to further improve recording density, there has also been proposed a magnetic head wherein it is possible to reduce the flying height of the magnetic head by incorporating a heat element such as a heater in the magnetic head, and causing the flying surface of the magnetic head to thermally expand to the magnetic disk side (JP-A-2006-190454). By employing this kind of technology, the reduction of the flying height of a magnetic head slider (the distance between the bottom surface of the magnetic head slider and the magnetic disk surface) in order to increase recording density in a magnetic disk device has advanced rapidly to a current level of 1 to 2 nm.

However, due to this kind of reduction of the magnetic head slider flying height, intermittent contact between the magnetic head slider and the magnetic disk while the magnetic recording device is being started up is unavoidable. Furthermore, a contact magnetic recording method that promotes the reduction of the magnetic head slider flying height, and assumes a continuous contact between the magnetic head slider and magnetic disk, has also been proposed, and from now on, an optimum design of a magnetic recording disk surface that assumes an intermittent or continuous contact is also required.

Under this kind of condition, the magnetic head flying position or contact position is liable to be affected by external factors, such as coarseness or undulation of the magnetic disk surface. In particular, the magnetic head slider has a natural frequency caused by a suspension that holds the magnetic head slider, and a natural frequency caused by an air film between the magnetic disk supporting the flying of the magnetic head and the magnetic head slider (hereafter called the "magnetic head air film"), and when a phenomenon of exciting of the natural frequencies occurs due to the external factors, the magnetic head slider resonates, and there is a danger that a stable write/read operation will no longer be possible (JP-A-2005-116112).

Also, a lubrication layer is formed on a current magnetic disk surface by applying a lubricant, such as Z-tetraol, with a polar end group that has a strong adsorption to a protection layer of the magnetic disk. However, in order to further promote the adsorption characteristic, it has become common to carry out a process such as an ultraviolet beam irradiation on the magnetic disk surface, thus hydrophilizing the surface of the protection layer. As a result of this, the lubricant in the lubrication layer has a stronger adsorption to the protection layer, and there is a tendency for the lubrication layer surface distribution to be controlled by surface form factors, such as coarseness and undulation of the magnetic disk surface. Consequently, even though the lubrication layer exists, the problem of magnetic head slider resonance still persists.

However, to date, the only way of suppressing the oscillation of the natural frequencies of the flying head slider with magnetic disk side conditions has been by planarizing forms such as coarseness and undulation of the disk surface as far as possible.

SUMMARY OF THE INVENTION

An object of the invention is to provide a new way of stabilizing flying behavior and contact behavior in a magnetic disk device, which is a magnetic recording device, without exciting a natural frequency of a flying magnetic head slider, thus maintaining product reliability over a long period.

In some embodiments of the present invention, a magnetic disk device comprises a magnetic disk having a non-magnetic substrate, a magnetic layer, a protection layer, and a lubrication layer that are sequentially stacked in the stated order. A surface of the lubrication layer has irregular structures disposed along a circumferential direction of the magnetic disk. Each irregular structure has a circumferential length that corresponds to a respective central angle thereof. Each irregular structure is positioned on the magnetic disk a distance away from the center of the magnetic disk in a radial direction corresponding to the central angle thereof, such that for irregular structures positioned the same distance away from said center, their central angles have the same value. The magnetic disk device includes a magnetic head slider that has a natural frequency of f and that magnetically records to the magnetic disk. A motor rotates the magnetic disk at a constant rotation speed $R_0$. The distance of each irregular structure away from said center is in a range in which the magnetic head slider operates. The central angle of each irregular structure is different from an angle $\theta_0$ expressed by the following equation $\theta_0 = 360 \times (R_0/60)/(f \times 1000)$.

In some embodiments of the present invention, a magnetic disk for a magnetic disk device is provided. The magnetic disk device includes a magnetic head slider that has a natural frequency of f and magnetically records to the magnetic disk as the magnetic disk rotates at a constant rotation speed $R_0$. The magnetic disk includes a non-magnetic substrate, a magnetic layer, a protection layer and a lubrication layer sequentially stacked in in the stated order. A surface of the lubrication layer has a plurality of irregular structures disposed along a circumferential direction of the magnetic disk. Each irregular structure has a circumferential length that corresponds to a respective central angle thereof. Each irregular structure is positioned on the magnetic disk a distance away from the center of the magnetic disk in a radial direction corresponding to the central angle thereof, such that for irregular structures positioned the same distance away from said center, their central angles have the same value. The distance of each irregular structure away from said center is in a range in which the magnetic head slider operates. Further, the central angle of each irregular structure is different from an angle $\theta_0°$ expressed by the following equation $\theta_0 = 360 \times (R_0/60)/(f \times 1000)$.

Some embodiments of the invention include forming a magnetic disk described above by forming the irregular structure pattern using an energy beam irradiation process.

By applying the invention, it is possible to realize stable slider behavior, without head slider oscillation being excited, even when there is intermittent contact or contact behavior of the magnetic head slider with respect to the magnetic disk surface.

DETAILED DESCRIPTION OF THE EMBODIMENTS

1. First Embodiment of the Invention

1. A magnetic disk device of a first embodiment of the invention is a magnetic disk device of a type that includes a. a magnetic disk wherein a lubricant layer surface has a cyclical specific irregular structure pattern in a circumferential direction of the disk, b. a magnetic head slider with a natural frequency of f (kHz), and c. a motor that can rotate the magnetic disk at a constant rotation speed $R_0$ (rotations/minute), and that magnetically records while an edge surface of the magnetic head slider continuously slides over, or intermittently comes into contact with, the magnetic disk.

The magnetic disc device can also include other parts necessary for operation of the device, for example, an actuator (positioning device) and swing arm.

Figure 4:
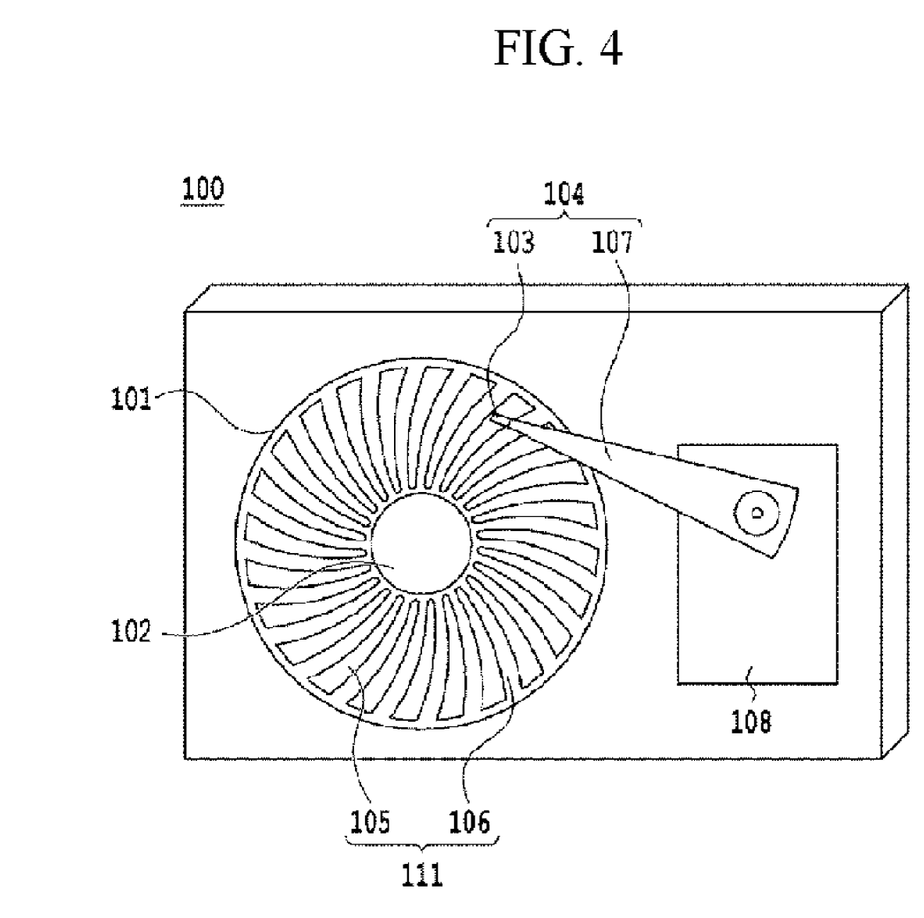
FIG. 4 is an outline diagram of a magnetic disk device of the invention.

FIG. 4 is an outline diagram of a magnetic disk device 100. The magnetic disk device 100 includes a magnetic disk 101, a motor 102 that rotates the magnetic disk 101, a magnetic head slider 104 formed by a magnetic slider 103, which carries out a write and read of data onto and from the magnetic disk 101, and a suspension 107, and a slider support arm 108 that supports the magnetic head slider 104.

There is a data region 111 formed by a servo signal region 105 and a data signal region 106 on the magnetic disk 101, and the magnetic head slider 104 reads servo information written into the servo signal region 105, detects its own position, carries out a movement and positioning using a rotary actuator, and accesses (writes in or reads from) the data signal region 106.

Figure 5:
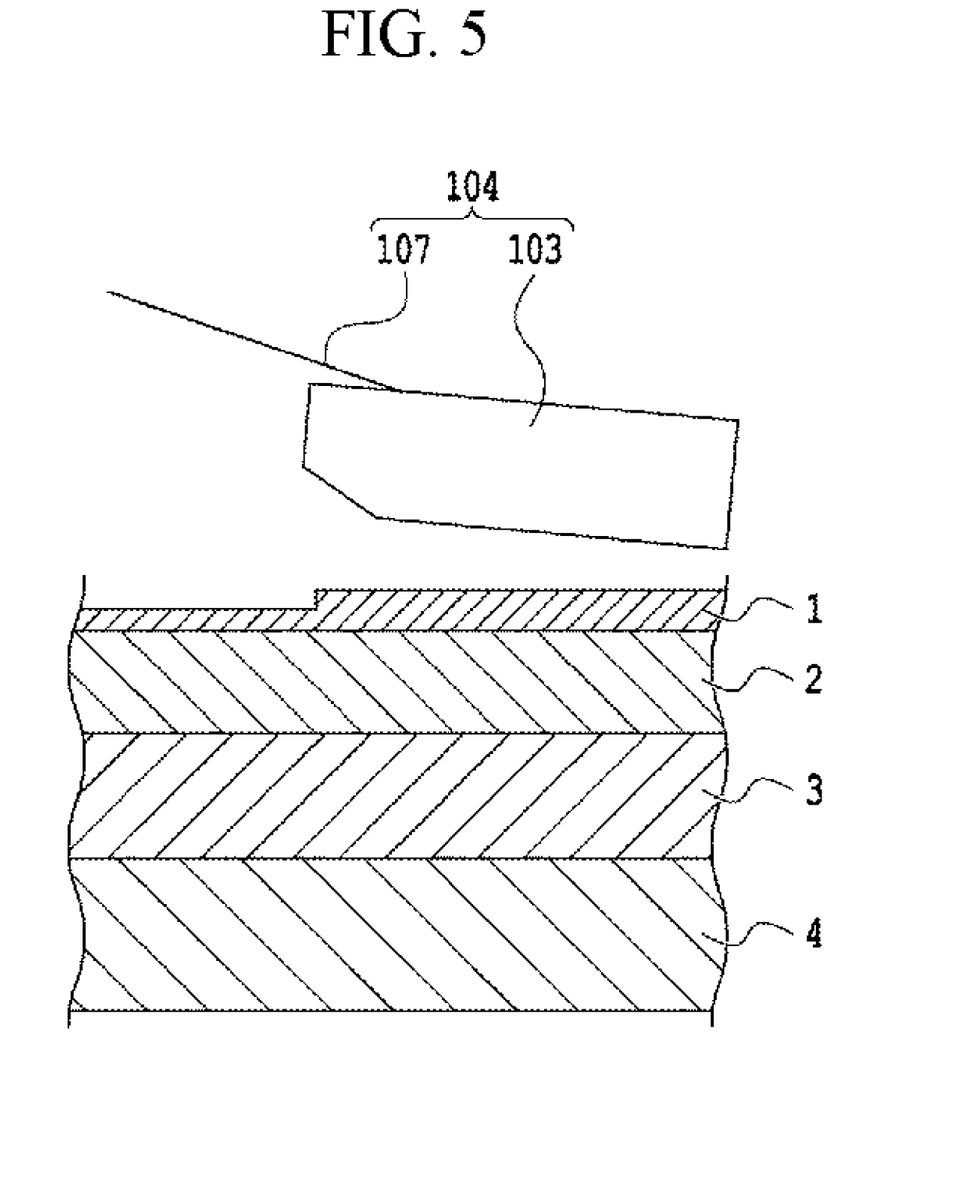
FIG. 5 is a schematic diagram showing the relationship between a magnetic head and the magnetic disk of embodiments according to the invention.

FIG. 5 is a schematic diagram showing the relationship between the magnetic head slider and magnetic disk of embodiments according to the invention. In the diagram, reference numeral 104 is the magnetic head slider, and is a commonly known one. The magnetic disk 101 is shown as a cross-section in a circumferential direction.

2. Magnetic Disk

Figure 1:
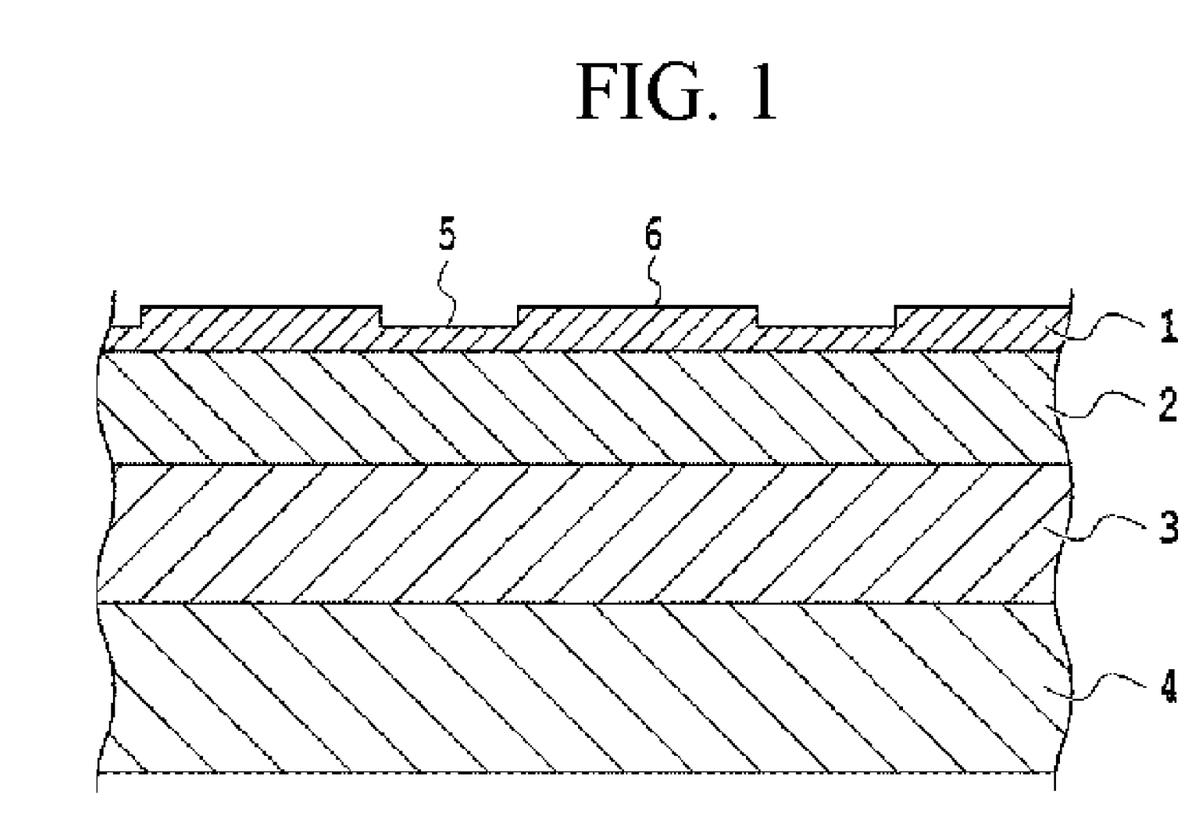
FIG. 1 shows an example of a schematic diagram of a magnetic disk according to the invention.

FIG. 1 is an example of a schematic diagram of the magnetic disk 101 according to the invention, and shows a circumferential direction cross-section in the data region.

The magnetic disk 101 is a medium wherein a magnetic layer 3, a protection layer 2, and a lubrication layer 1 are sequentially stacked on a non-magnetic substrate 4. An irregular structure formed by a depression (a thin film region) 5 and a protrusion 6 is formed on the lubrication layer 1.

2-1. Protection Layer

The protection layer 2 is a layer that protects the magnetic layer from contact sliding against the magnetic head slider 104, and is preferably configured of a carbonaceous film. A carbon film, a hydrogenated carbon film, a silicon carbide film, or the like, can be proposed as a carbonaceous film, and among these, a carbon film, in particular a diamond-like carbon (DLC) film, is preferable in terms of its high density and high durability.

In the invention, as will also be described in 2-2 below, the surface of the lubrication layer 1 forms a cyclical specific irregular structure pattern in the circumferential direction of the magnetic disk 101 owing to an adsorption between the surface of the protection layer 2 and the lubrication layer 1. It is supposed that adsorption here occurs owing to a hydrogen bond between a hydrophilic surface formed in a constant cyclical pattern on the surface of the protection layer 2 and a polar group in a lubricant forming the lubrication layer 1. That is, a phenomenon whereby the lubrication layer 1 flows from a surface region of the protection layer 2 that has not received hydrophilic treatment to a surface region of the protection layer 2 that has received hydrophilic treatment occurs owing to an interaction based on a hydrogen bond between a polar group included in the lubricant and the hydrophilic surface of the protection layer 2 (Shinji Komatsu et al, "Effect of Interactions between Lubricant Porality End Groups and Solid Surfaces on Patterning of Nanometer-Thick Lubricant Films", pp 415 and 416, Proceedings of the 2008 Fall Tribology Symposium, 2008). Then, as a result of this movement phenomenon, the lubrication layer 1 forms a region in the surface region of the protection layer 2 that has not received hydrophilic treatment in which it is thin in comparison with the lubrication layer 1 in the surface region of the protection layer 2 that has received hydrophilic treatment, and an irregular structure pattern is formed on the surface of the magnetic disk 101.

An energy beam irradiation, a plasma processing, or the like, can be proposed as methods of hydrophilizing the surface of the protection layer 2, wherein an energy beam refers to an optical beam (an ultraviolet beam, infrared beam, or laser beam), an ion beam, or an electron beam. Among such processes, an energy beam irradiation, in particular an ultraviolet beam irradiation, is preferable in terms of suppressing damage (volatile loss) to the lubrication film, which is a liquid.

Although it is also possible to carry out such hydrophilic treatment before forming the lubrication layer 1, it is preferable in terms of eliminating the effect of external air (oxygen in the air) that the treatment is carried out after forming the lubrication layer 1.

For example, a lithography technique (Japanese Patent No. 4,092,407) can be preferably applied to the formation of a hydrophilic surface with a cyclical pattern on the surface of the protection layer 2.

2-2. Lubrication Layer

The lubrication layer 1 is a layer that reduces friction when contact sliding against the magnetic head slider 104, improving wear resistance.

Lubricant

The lubricant configuring the lubrication layer 1 of the invention has a polar group with lone electron pairs that can form a hydrogen bond. Because of this, adsorption to the hydrophilic surface on the surface of the protection layer 2 is possible, and it is possible to form a cyclical specific irregular structure pattern in the circumferential direction of the disk.

A group including electrons with lone electron pairs of O, N, F, S, Cl, or the like, which are electrically negative electrons, can be proposed as such a polar group.

It is possible to preferably use, for example, a polyfluoropolyether, in particular a lubricant called perfluoropolyether (PFPE), as the lubricant. This is particularly preferable when using a carbonaceous film, or more preferably a diamond-like carbon (DLC) film, as the protection layer 2, in terms of being able to secure adhesiveness with such a protection layer 2.

A typical PFPE is a lubricant structure with the structure of 1 or 2 below.

(Herein, n and m are positive integers, while R and R' represent end group structures).

(Herein, n is a positive integer, while R and R' represent end group structures).

The above structures are called 1 Fomblin (product name) and 2 Demnum (product name) respectively.

Of these, for example, Z-tetraol (product name, manufactured by Solvay-Solexis) is preferably used as the lubricant of the magnetic disk device, and the end groups R and R' have the structure of 3 below as opposed to the main chain structure shown in 1 above.

Irregular Structure Pattern

The surface of the lubricant layer 1 of the magnetic disk of the invention has an irregular structure pattern repeated at constant central angle $\theta_r$ (°) intervals in the circumferential direction of the magnetic disk. Herein, the central angle $\theta_r$ (°) is an angle that represents the repetition cycle of the irregular structure pattern in the circumferential direction in a position (hereafter called the "radial position r") a distance r (mm) away from the center of the magnetic disk in a radial direction as a central angle of the magnetic disk (note that the whole circumference is assumed to be (360°).

Then, the central angle $\theta_r$ (°) is set so that it is possible to realize a stable sliding behavior, without exciting any oscillation of the magnetic head slider 104, when there is an intermittent contact or contact behavior of the magnetic head slider 104 on the surface of the magnetic disk 101. That is, it is necessary to set the central angle $\theta_r$ (°) so that, when the natural frequency of the magnetic head slider 104 at any radial position r (mm) in a range in which the magnetic head slider 104 operates is f (kHz), the central angle $\theta_r$ (°) does not coincide with an angle $\theta_0$ (°) expressed by the following equation a:

$$\theta_0 = 360 \times (R_0/60)/(f \times 1000) \quad a$$

Herein, $R_0$ represents the magnetic disk rotation speed (rotations/minute), and corresponds to the rotation speed of the motor (a so-called spindle motor) 102 of the magnetic disk device 100.

By setting the central angle $\theta_r$ (°) under such a condition, it is possible to avoid exciting oscillation (a so-called surging) of the magnetic head slider 104.

As will be described in 2-3 below, both a natural frequency value caused by the suspension 107 that holds the magnetic slider 103 and a natural frequency value caused by an air film between the magnetic slider 103 and magnetic disk 101 are included in the natural frequency f (kHz) of the magnetic head slider, and not only a primary natural frequency but also a high order natural frequency is included. Consequently, as there exists a $\theta_0$ corresponding to each natural frequency f (kHz), the central angle $\theta_r$ is set so that it does not coincide with either $\theta_0$.

It can be equally well said that the condition of the cycle of the irregular structure pattern is that a periphery $s_r$ (μm) in the radial position r (mm) of the magnetic disk 101 is set so that, in any radial position r (mm) in the range in which the magnetic head slider 104 operates, it does not coincide with $s_{r0}$ (μm) expressed by the following equation b:

$$S_{r0} = 2\pi r \times (R_0/60)/f \quad b$$

Naturally, although the perimeter $s_{r0}$ depends on the rotation speed $R_0$ and radial position r (mm) of the magnetic disk 101, the angle of rotation $\theta_0$ depends only on the disk rotation speed $R_0$, regardless of the radial position r (mm).

Although the central angle $\theta_r$ (°) representing the cycle of the irregular structure pattern may have different values for different radial positions r (mm), it is preferable in terms of suppressing the occurrence of head flying instability caused by discontinuous frequency in a frequency change radial position that the central angle $\theta_r$ (°) is constant, regardless of the radial position r (mm). When the central angle $\theta_r$ (°) is constant, regardless of the radial position r (mm), the alternately repeated depressed portion region and protruding portion region each form a fan-shaped region.

Also, in order to set the central angle $\theta_r$ (°) of the irregular structure pattern so as not to coincide with the angle $\theta_0$ (°), it is preferable that the central angle $\theta_r$ (°) is set with respect to the angle $\theta_0$ (°) to be $\theta_r < 0.9 \times \theta_0$ or $\theta_r > 1.1 \times \theta_0$. By so doing, it is possible to suppress the oscillation of the magnetic head to at least less than half of the oscillation when an exciting phenomenon occurs.

Although it is possible to express the frequency corresponding to the cycle of the irregular structure pattern of the lubrication layer by $6R_0/\theta_r$ (Hz), an upper limit frequency thereof can be 1 MHz, and a lower limit frequency 20 kHz. With a current magnetic head slider, suspension excited oscillation is in the region of 50 to 100 kHz, and air film natural frequency when the magnetic head flies is in the region of 300 to 400 kHz. Therefore, the lower limit of 20 kHz and upper limit of 1 MHz are adopted as values that can sufficiently encompass those frequency values.

Irregular Structure Pattern Formation Example

Hereafter, a more specific description will be given of an example of forming an irregular structure pattern on a magnetic disk lubrication layer surface, using an example of an ultraviolet beam irradiation of the surface of a magnetic disk on which a lubrication layer has already been formed. Naturally, there is no intention of limiting the invention to this.

Figure 2:
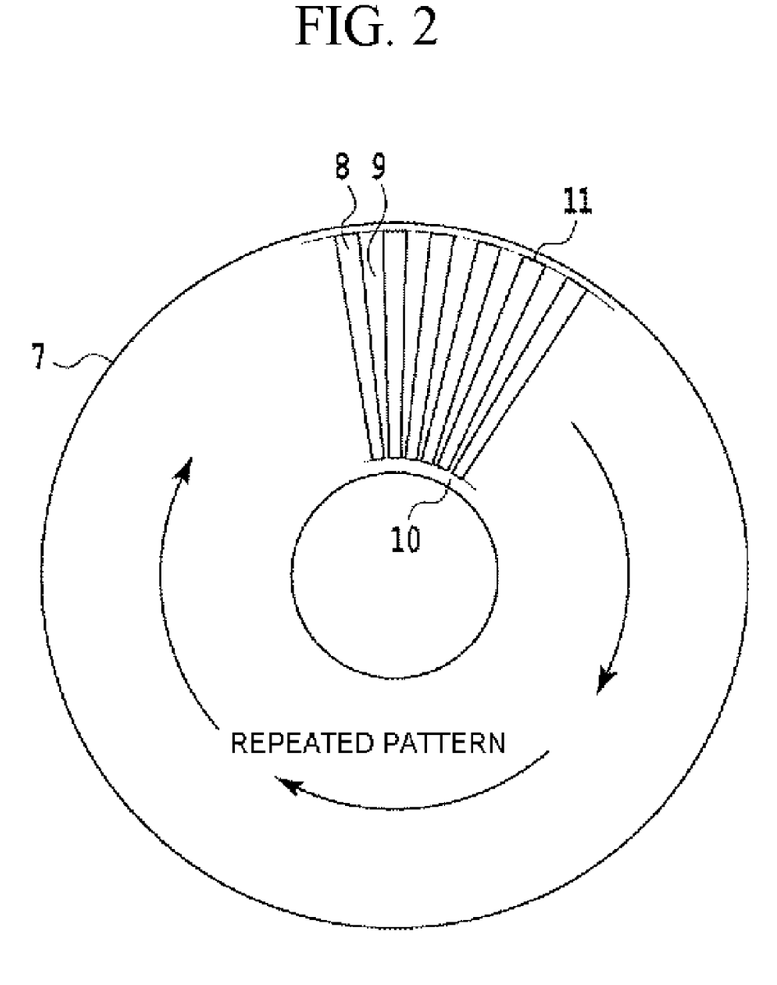
FIG. 2 shows an example of an ultraviolet beam irradiation region on the surface of the magnetic disk according to the invention.

Firstly, a region (region A) in which an ultraviolet beam irradiation is carried out and a region (region B) in which no ultraviolet beam irradiation is carried out are alternately provided cyclically in a data region (a region through which the magnetic head slider passes) on a surface of a magnetic disk substrate 7 on which no irregular structure has yet been formed, and processing is carried out (refer to FIG. 2). FIG. 2 shows an example wherein an ultraviolet beam irradiation region is fabricated in a radial direction as an example of such a region setting, and an irregular structure unit of the lubrication layer 1 is set so as to be cyclically repeated at every specific angle of rotation (corresponding to the central angle $\theta_r$) of the magnetic disk 100 with respect to the direction of movement (circumferential direction) of the magnetic head slider 104 flying above the magnetic disk in any radial position. This corresponds to the case in which the central angle $\theta_r$ representing the cycle of the irregular structure pattern takes a constant value, regardless of the radial position r. Then, in FIG. 2, the central angle $\theta_r$ (°) corresponds to a central angle corresponding to a region wherein reference numeral 8, which is the region A (ultraviolet beam irradiation region), and reference numeral 9, which is the region B (non-ultraviolet beam irradiation region), are combined. Also, FIG. 2 shows an example wherein the central angles of each of the fan-shaped regions of the region A and region B are equal.

In order to form the irregular lubrication layer distribution, it is possible to apply the lithography technique described in Japanese Patent No. 4,092,407. That is, it is possible to fabricate the irregular structure of the lubrication layer 1 on the disk surface by fabricating a photomask with a pattern wherein a transparent region (slit) and opaque region (mask) are disposed alternately, and irradiating the magnetic disk surface with an ultraviolet beam via the mask.

After the implementation of the ultraviolet beam irradiation, a lubrication layer 1 flowing phenomenon occurs at the interface of the region A and region B, and there occurs a movement of the lubricant from the region B to the region A (Shinji Komatsu et al, "Effect of Interactions between Lubricant Porality End Groups and Solid Surfaces on Patterning of Nanometer-Thick Lubricant Films", pp 415 and 416, Proceedings of the 2008 Fall Tribology Symposium, 2008). As a result of this movement phenomenon, the lubrication layer 1 forms a region in the region B in which it is thin in comparison with the lubrication layer 1 in the region A, and an irregular structure pattern is formed on the surface of the magnetic disk. That is, an irregular structure in the lubrication film distribution is formed cyclically and continuously with respect to the flying movement direction of the magnetic head slider. Herein, a cyclical repeated unit of the irregular structure is configured in the circumferential direction of the magnetic disk in one region A and one region B adjacent thereto.

Figure 3:
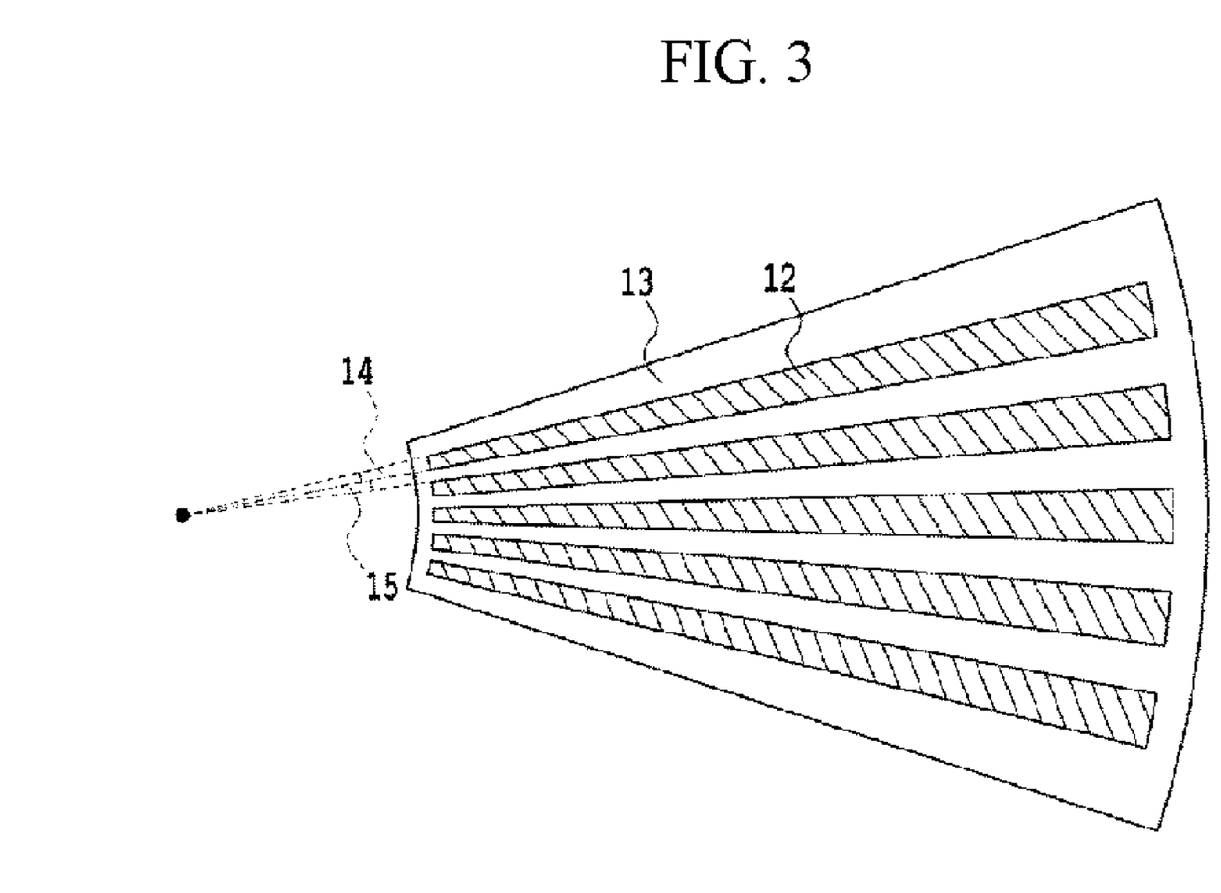
FIG. 3 shows an example of a slit form in a photomask for manufacturing the magnetic disk of the invention.

Herein, although the central angle $\theta_r$ corresponding to a slit interval corresponds to the sum of a slit angle 14 and a non-slit angle 15 in FIG. 3, FIG. 3 shows a case in which the slit angle 14 and non-slit angle 15 are equal. However, that the angles of the two are equal is not a condition that is essential as a condition satisfying the invention. In the kind of case in FIGS. 2 and 3, which is a case in which the central angle $\theta_r$ is constant regardless of the radial position r, a result of considering the amount of lubricant necessary for forming the irregular structure of the lubrication layer suggests that, when the region wherein reference numeral 8, which is the region A (the ultraviolet beam irradiation region in the data region), and reference numeral 9, which is the region B (the non-ultraviolet beam irradiation region in the data region), are combined has a constant area, it is preferable in order to more effectively form the irregular structure of the lubrication layer that a ratio between the "slit angle corresponding to the region A" and the "non-slit angle corresponding to the region B", that is, "slit angle corresponding to the region A":"non-slit angle corresponding to the region B", of 1:3 is the lower limit of the slit angle, while 3:1 is the upper limit of the slit angle. That is, by the slit angle being equal to or greater than the lower limit value, it is possible to increase the area of the region A corresponding to the protruding portion, which is the destination of the movement of the lubrication layer from the region B, which is more preferable for the flying of the magnetic head. Meanwhile, by the slit angle being equal to or smaller than the upper limit value, it is possible to secure a greater amount of the lubricant layer moving from the region B to the region A, and possible to form an irregular structure with a larger level difference, which is more preferable for the flying of the magnetic head.

Also, it is desirable for the flying of the magnetic head that the level difference of the irregularity has a peak-to-peak value of 1 Å or more.

2-3. Magnetic Head Slider

The magnetic head slider has a natural frequency f (kHz). Both a natural frequency value caused by the suspension 107 that holds the magnetic slider 103 and a natural frequency value caused by an air film between the magnetic slider 103 and magnetic disk 101 are included in the natural frequency.

The natural frequency value caused by the suspension 107 that holds the magnetic slider 103 and the natural frequency value caused by an air film between the magnetic slider 103 and magnetic disk 101 can be measured using, for example, a method disclosed in JP-A-2005-116112. Also, not only a primary natural frequency but also a high order natural frequency is included, in a range of 1 MHz to 20 kHz, in the natural frequencies. The high order natural frequency corresponds to a value obtained by multiplying the primary natural frequency by a natural number of two or more.

A 100 kHz natural frequency measured in an embodiment of JP-A-2005-116112 corresponds to the primary natural frequency value caused by the suspension 107 that holds the magnetic slider 103, while a 140 kHz natural frequency measured in an embodiment of JP-A-2005-116112 corresponds to the primary natural frequency value caused by an air film between the magnetic slider 103 and magnetic disk 101.

2-4. Other

It is possible to propose an aluminum alloy substrate, a ceramic substrate of glass or the like, a resin substrate of polycarbonate or the like, a carbonaceous substrate, or the like, as the non-magnetic substrate 4.

The magnetic layer 3 is a recording layer of the magnetic disk medium and, with a ferromagnetic element such as iron, cobalt, or nickel as a main component, can be configured of an alloy wherein chromium, platinum, tantalum, or the like, is added, or from an oxide of one of these. The magnetic layer 3 can be formed using a plating method, a sputtering method, or the like.

2. Second and Third Embodiments of Invention

Apart from the magnetic disk device 100, the invention also incorporates a magnetic disk 101 (a second embodiment) that can be preferably used in the magnetic disk device 100 and the method (a third embodiment) of forming an irregular structure pattern on the lubrication layer 1 surface of the magnetic disk using an energy beam irradiation process.

Working Example

Magnetic Disk Device

A magnetic head slider is installed in a tribology testing device (manufactured by VENA, 6500 system) that evaluates the head disk interface (HDI) characteristics of the magnetic head slider. A carbonaceous protection film (a tetrahedral amorphous carbon (ta-C) film) is formed on the surface (air bearing surface (ABS)) of the magnetic head slider.

An acoustic emission (AE) sensor is installed on a slider support arm on which the magnetic head slider is installed. The AE sensor can detect an occurrence of contact between the magnetic head slider and a magnetic disk medium.

The magnetic head slider used in the testing is configured of a Pemto size (1.2 mm×0.8 mm) magnetic slider and a suspension that supports the magnetic slider, and has a primary natural frequency cycle of around 80 kHz caused by the suspension, and a primary natural frequency cycle generated at around 230 kHz caused by an air film, as primary natural frequencies.

The magnetic disk 101 used in the working example is 65 mm in diameter, the rotation speed used for the magnetic disk 101 is 5,400 rpm, and the angles $\theta_0$ corresponding to the primary natural frequencies 80 kHz and 230 kHz of the magnetic head slider, when calculated using Equation a, are 0.41° and 0.14° respectively. Consequently, the central angle $\theta_r$ of a cyclical irregular structure pattern to be formed is set so as not to coincide with $(0.41/n)°$ or $(0.14/m)°$, including also a high order natural frequency. Herein, n and m are optional natural numbers.

Magnetic Disk Fabrication

In the invention, it is important that the lubrication layer distribution is formed by determining the angle $\theta_r$ so that an irregular structure pattern of the lubrication layer 1 corresponding to the angles $\theta_0$ is not formed.

In the working example, the magnetic disk for the testing is fabricated by applying Z-tetraol (product name), which is a lubricant, to an average thickness of 0.9 nm and, after forming the lubricant layer, implementing an ultraviolet beam irradiation process on the lubricant layer surface.

Photomasks with cyclical patterns whose central angles are 0.41°, 0.30°, and 0.14° are fabricated for the ultraviolet beam irradiation process. An outline diagram of the pattern is shown as FIG. 3. Although only one portion of the photomask is shown in FIG. 3, the pattern shown in the diagram actually continues cyclically over the whole circumference (360°) at intervals of the central angle, and the ultraviolet beam irradiation process is implemented at one time covering the whole of the magnetic disk surface. Herein, the central angle corresponding to the slit interval of the photomask corresponds to the sum of the slit angle 14 and non-slit angle 15 in the photomask in FIG. 3. In the working example, the ratio between the sizes of the slit angle 14 and non-slit angle 15 is 1:1.

A high-output low-pressure mercury vapor lamp (output 200 W, wavelength 185 nm) in an ultraviolet beam irradiation device manufactured by Sen Lights Corporation is used in the ultraviolet beam irradiation process. Also, in the working example, the distance between the magnetic disk surface and the lamp is 24 mm.

Magnetic disks, each with an irregular structure on the lubrication layer, are fabricated using each of the photomasks. Also, a disk on which an ultraviolet beam irradiation process is implemented with no mask processing is also fabricated for a further comparison. The fabricated magnetic disks A to D are shown below.

Magnetic disk A (comparison item): a magnetic disk on which an ultraviolet beam processing is implemented using a photomask with a cyclical pattern at intervals of the central angle 0.41°

Magnetic disk B (invention item): a magnetic disk on which an ultraviolet beam processing is implemented using a photomask with a cyclical pattern at intervals of the central angle 0.30°

Magnetic disk C (comparison item): a magnetic disk on which an ultraviolet beam processing is implemented using a photomask with a cyclical pattern at intervals of the central angle 0.14°

Magnetic disk D (comparison item): a magnetic disk on which only an ultraviolet beam processing is implemented (no photomask is used)

Performance Evaluation

The magnetic disks A to C, each having a cyclical irregular structure on the lubrication layer, and the magnetic disk D that has no irregular structure, fabricated using the heretofore described process, are installed in the tester. Next, the magnetic head slider is caused to fly at a flying height of 1 nm in a position 22 mm away from the center of the magnetic disk medium in a radial direction, at a disk rotation speed of 5,400 rpm, above each of the magnetic disks (the magnetic disks A, B, C, and D), and a fixed point flying test is implemented for 12 hours.

With the magnetic disk medium A, an occurrence of an AE signal output is observed immediately after the start of testing, and the AE signal output is subsequently maintained in a constantly high condition throughout the 12 hours of testing.

Meanwhile, with the magnetic disc medium B, no increase in AE signal output is observed throughout the 12 hours of testing.

With the magnetic disk medium C, an occurrence of an AE signal output is observed immediately after the start of testing, and the AE signal output is subsequently maintained in a constantly high condition throughout the 12 hours of testing.

Also, with the magnetic disk medium D, although no occurrence of an AE signal output is observed immediately after the start of testing, an occurrence of an AE signal output is observed approximately six hours after the start of testing, and the AE signal tends to increase subsequently until the end of testing.

Test Result Interpretation

With the magnetic disks A and C (comparison items with a cyclical irregular structure), in each case, the irregular structure pattern of the lubrication layer formed by an ultraviolet beam irradiation using a photomask coincides with the primary natural frequency of the flying magnetic head slider, and it is thought that, as slider oscillation is excited at a timing at which an intermittent contact of the slider with the disk occurs, an occurrence of an AE signal output is observed immediately after the start of testing.

Also, with the magnetic disk D (comparison item with no cyclical irregular structure), although no occurrence of an AE signal output is observed for a while after the start of testing, it is thought that, in the event that a fairly strong contact occurs as a part of an intermittent contact phenomenon that occurs with a certain probability during the testing, slider oscillation is excited after all due to the effect of the surface form of the magnetic disk, meaning that an occurrence of an AE signal output is observed in this case too.

Meanwhile, with the magnetic disk B (invention item), as the lubrication layer exists in a form that covers and hides the disc surface form, the exciting effect of the surface form on the magnetic head slider is suppressed, and furthermore, as the irregular form of the lubrication layer itself also coincides with neither the primary natural frequency nor the high order natural frequency of the head slider, it does not happen that the magnetic head slider is excited. It is thought that for this reason no occurrence of an AE signal output is observed during the testing.

What is claimed is:

1. A magnetic disk device comprising:
   a magnetic disk having a non-magnetic substrate, a magnetic layer, a protection layer and a lubrication layer that are sequentially stacked in the stated order,
   a surface of the lubrication layer having a plurality of irregular structures disposed along a circumferential direction of the magnetic disk, each irregular structure having a circumferential length that corresponds to a respective central angle thereof,
   each irregular structure being positioned on the magnetic disk a distance away from the center of the magnetic disk in a radial direction corresponding to the central angle thereof, such that for irregular structures positioned the same distance away from said center, their central angles have the same value;
   a magnetic head slider that has a natural frequency of f and that magnetically records to the magnetic disk; and
   a motor that rotates the magnetic disk at a constant rotation speed $R_0$,
   the distance of each irregular structure away from said center being in a range in which the magnetic head slider operates, the central angle of each irregular structure being different from an angle $\theta_0$ expressed by the following equation:

$$\theta_0 = 360 \times (R_0/60)/(f \times 1000).$$

2. The magnetic disk device according to claim 1, wherein each central angle of each irregular structure is less than $0.9 \times \theta_0$ or is greater than $1.1 \times \theta_0$.

3. The magnetic disk device according to claim 1, wherein the central angle of each irregular structure is the same.

4. The magnetic disk device according to claim 1, wherein the lubrication layer is a polyfluoropolyether lubrication layer.

5. The magnetic disk device according to claim 1, wherein the irregular structures are formed by an energy beam irradiation process.

6. The magnetic device according to claim 1, wherein the irregular structures are formed by an adsorption between the lubrication layer and the surface of the protection layer.

7. The magnetic device according to claim 1, wherein each irregular structure has a thin film region and a protrusion region that has a greater height than the thin film region.

8. The magnetic device according to claim 1, wherein the magnetic head slider magnetically records to the magnetic disk while a surface of the magnetic head slider continuously slides over, or intermittently comes into contact with, the magnetic disk.

9. The magnetic device according to claim 1, wherein irregular structures, among the plurality of irregular structures, have the same value of the distance from said center.

10. A magnetic disk for a magnetic disk device that has a magnetic head slider that has a natural frequency of f and that magnetically records to the magnetic disk as the magnetic disk rotates at a constant rotation speed $R_0$, the magnetic disk comprising:
  a non-magnetic substrate;
  a magnetic layer;
  a protection layer; and
  a lubrication layer,
wherein the non-magnetic substrate, the magnetic layer, the protection layer and the lubrication layer are sequentially stacked in the stated order,
a surface of the lubrication layer having a plurality of irregular structures disposed along a circumferential direction of the magnetic disk, each irregular structure having a circumferential length that corresponds to a respective central angle thereof,
each irregular structure being positioned on the magnetic disk a distance away from the center of the magnetic disk in a radial direction corresponding to the central angle thereof, such that for irregular structures positioned the same distance away from said center, their central angles have the same value,
the distance of each irregular structure away from said center being in a range in which the magnetic head slider operates, the central angle of each irregular structure being different from an angle $\theta_0°$ expressed by the following equation:

$$\theta_0 = 360 \times (R_0/60)/(f \times 1000).$$

11. A method of manufacturing comprising forming the magnetic disk according to claim 10 by forming the irregular structure patterns using an energy beam irradiation process.

12. The magnetic disk according to claim 10, wherein the irregular structures are formed by an adsorption between the lubrication layer and the surface of the protection layer.

13. The magnetic disk according to claim 10, wherein each irregular structure has a thin film region and a protrusion region that has a greater height than the thin film region.

14. The magnetic device according to claim 10, wherein the magnetic head slider magnetically records to the magnetic disk while a surface of the magnetic head slider continuously slides over, or intermittently comes into contact with, the magnetic disk.

15. The magnetic device according to claim 10, wherein irregular structures, among the plurality of irregular structures, have the same value of the distance from the center.

* * * * *